United States Patent
Grason et al.

(10) Patent No.: US 7,752,331 B2
(45) Date of Patent: Jul. 6, 2010

(54) INFORMATION GATEWAY MANAGER FOR MULTIPLE DEVICES

(75) Inventors: Thomas S. Grason, Lawrenceville, GA (US); Scott J. Downes, Doraville, GA (US); Rita Patel, Atlanta, GA (US); Mark E. Podojil, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1310 days.

(21) Appl. No.: 10/020,646

(22) Filed: Oct. 30, 2001

(65) Prior Publication Data
US 2003/0084093 A1 May 1, 2003

(51) Int. Cl.
G06F 15/173 (2006.01)

(52) U.S. Cl. .................................. 709/238; 709/223

(58) Field of Classification Search ................. 709/202, 709/203, 206, 217, 219, 225; 707/3, 10
See application file for complete search history.

(56) References Cited

U.S. PATENT DOCUMENTS

| | | | | |
|---|---|---|---|---|
| 5,701,451 A | | 12/1997 | Rogers et al. | 395/600 |
| 5,768,528 A | * | 6/1998 | Stumm | 709/231 |
| 5,978,842 A | * | 11/1999 | Noble et al. | 709/218 |
| 6,012,083 A | | 1/2000 | Savitzky et al. | 709/202 |
| 6,119,149 A | | 9/2000 | Notani | 709/205 |
| 6,128,279 A | * | 10/2000 | O'Neil et al. | 370/229 |
| 6,195,653 B1 | * | 2/2001 | Bleizeffer et al. | 707/2 |
| 6,230,193 B1 | | 5/2001 | Arunkumar et al. | 709/218 |
| 6,310,889 B1 | | 10/2001 | Parsons et al. | 370/466 |
| 6,327,628 B1 | | 12/2001 | Anuff et al. | 709/311 |
| 6,351,771 B1 | | 2/2002 | Craddock et al. | 709/227 |
| 6,366,915 B1 | * | 4/2002 | Rubert et al. | 707/10 |
| 6,374,300 B2 | * | 4/2002 | Masters | 709/229 |
| 6,418,462 B1 | | 7/2002 | Xu | 709/201 |
| 6,449,647 B1 | * | 9/2002 | Colby et al. | 709/226 |
| 6,526,442 B1 | * | 2/2003 | Stupek et al. | 709/224 |
| 6,615,253 B1 | * | 9/2003 | Bowman-Amuah | 709/219 |
| 6,741,980 B1 | * | 5/2004 | Langseth et al. | 707/2 |
| 6,757,900 B1 | * | 6/2004 | Burd et al. | 709/203 |
| 6,823,373 B1 | * | 11/2004 | Pancha et al. | 709/219 |

(Continued)

OTHER PUBLICATIONS

Kassem; "Designing Enterprise Applications with the Java 2 Platform, Enterprise Edition"; Copyright 2000 by Sun Microsystems, Inc.; ISBN 0201702770 4th Printing Jun. 2001.

*Primary Examiner*—Aaron Strange
(74) *Attorney, Agent, or Firm*—Eduardo Guntin; Andrew C. Gust; Akerman Senterfitt

(57) ABSTRACT

A system for providing information to users and for managing and routing requests from users. The information delivery system is preferably a platform independent application, which enables users to receive responses based upon on-demand, scheduled or event driven requests or triggers. On-demand requests are those that a user sends and, some time later, receives a response with the requested information. Scheduled requests are those provided to users who subscribe to a service offering. On a set schedule, information is sent to the user based upon the information desired and criteria selected. Event driven responses are generated based upon certain criteria or thresholds being met. For each of the above types of requests, the responses may be formatted in plain text, Hypertext Markup Language (HTML) or other format depending upon the requestor device type or the subscriber's specified e-mail client.

21 Claims, 4 Drawing Sheets

U.S. PATENT DOCUMENTS

| | | | |
|---|---|---|---|
| 6,839,700 B2 * | 1/2005 | Doyle et al. | 707/2 |
| 6,850,982 B1 * | 2/2005 | Siegel | 709/203 |
| 6,961,776 B1 * | 11/2005 | Buckingham et al. | 709/229 |
| 7,117,269 B2 * | 10/2006 | Lu et al. | 709/238 |
| 7,225,237 B1 * | 5/2007 | Tenereillo | 709/219 |
| 2001/0056354 A1 * | 12/2001 | Feit et al. | 705/1 |
| 2002/0007415 A1 * | 1/2002 | Douglis et al. | 709/230 |
| 2002/0042839 A1 * | 4/2002 | Peiffer et al. | 709/238 |
| 2002/0087657 A1 * | 7/2002 | Hunt | 709/217 |
| 2002/0107962 A1 * | 8/2002 | Richter et al. | 709/225 |
| 2002/0143965 A1 * | 10/2002 | Aiken, Jr. | 709/229 |
| 2002/0188753 A1 * | 12/2002 | Tang et al. | 709/237 |
| 2003/0009571 A1 * | 1/2003 | Bavadekar | 709/230 |
| 2003/0046337 A1 * | 3/2003 | Strahm et al. | 709/203 |
| 2003/0053420 A1 * | 3/2003 | Duckett et al. | 370/252 |
| 2004/0199577 A1 * | 10/2004 | Burd et al. | 709/203 |

* cited by examiner

INFORMATION GATEWAY MANAGER FOR MULTIPLE DEVICES

FIELD OF THE INVENTION

The present application relates generally to information management. In particular, the present invention is directed to an apparatus and method for managing, routing and displaying requests for information between disparate client devices and information stores.

BACKGROUND OF THE INVENTION

The proliferation of wireless devices has made obtaining information easier than ever. Many wireless "portals" exist that allow users of wireless devices (e.g., two-way pagers, cellular telephones, PDAs, etc.) to request certain types of information by sending a request to the portal. Typical types of requests include requests for driving directions, phone numbers, weather condition, stock quotes, etc. These portals are relatively simple in their operation. The portal receives the request from the wireless device, typically in the form of a specially formatted e-mail or two-way page. The portal processes the request and then returns a device-dependent formatted reply to the requestor.

Examples of such a portals are HZ.com and infobeam.net. Both allow two-way pagers and other portable devices to send special commands as an e-mail message or page to a specific address to request information from the service. However, these services are limited in that they operate on a synchronous, on-demand basis. That is, they only respond to requests in the order they are received and do not automatically forward or update requests. Also, they typically do not automatically inform users of events. Another limitation is that they are limited in the number of devices they support.

Another limitation of these systems is that they use a proprietary client interface. As such the user must keep the interface software current, otherwise, information services may not be presented. Further, these interfaces often limit the type of requests that can be made, or frustrate users because they require information as part of the request that the user does not have. For example, a directory service request may require that the user enter a street address of the person they wish to look-up.

There also exist so-called "push" services. These services send information without on-demand user requests. These services can be analogized to television or radio broadcasts. These services may send information such as breaking news events and the like as it occurs to anyone who subscribes to their services. However, as the name implies, these services send information without any regard for the recipient's individual needs for the information. This disadvantageously may overwhelm the user with large amounts of unwanted information and possibly create a situation where the user may miss desired information.

Yet another limitation of these systems is they are not enterprise solutions. Most corporations have large Intranets and internal data services that are not easily accessed outside the corporate infrastructure. Conventional portals do not provide a way for end users to query this internal corporate information.

Thus, there is need for a system that not only responds to on-demand requests, but also schedules and provides event driven information. Further, there is a need for a cross-platform solution that enables requests to and from many different end devices. Still further, there is a need for an information delivery system that is easily scaled and extensible to corporate infrastructures. The present invention is directed to solving the above problems, as well as other needs.

SUMMARY OF THE INVENTION

The present invention addresses the needs identified above in that it provides a distributed information processing system that includes a client device interface adapted to receive requests for information from a plurality of remote devices, a module manager adapted to receive and route said requests from said client device interface, and a plurality of information modules. The information modules register with the module manager and module manager routes the request to an appropriate one of the information modules in accordance with a type of information requested.

In accordance with a feature of the invention, the appropriate one of the plurality of information modules generates a response that is returned to the module manager, and wherein the module manager routes the response to the client interface device for delivery to a requestor.

In accordance with another feature of the invention, a subscription service maintains a subscriber database, and when the information modules send information, the subscription center is consulted to determine to which clients the information should be forwarded.

In accordance with another aspect of the invention, a method of receiving, routing and responding to requests is provided within the information processing system.

These and other aspects of the present invention will be elucidated in the following detailed description of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings.

DETAILED DESCRIPTION OF THE PREFERRED EMBODIMENTS

Figure 1:
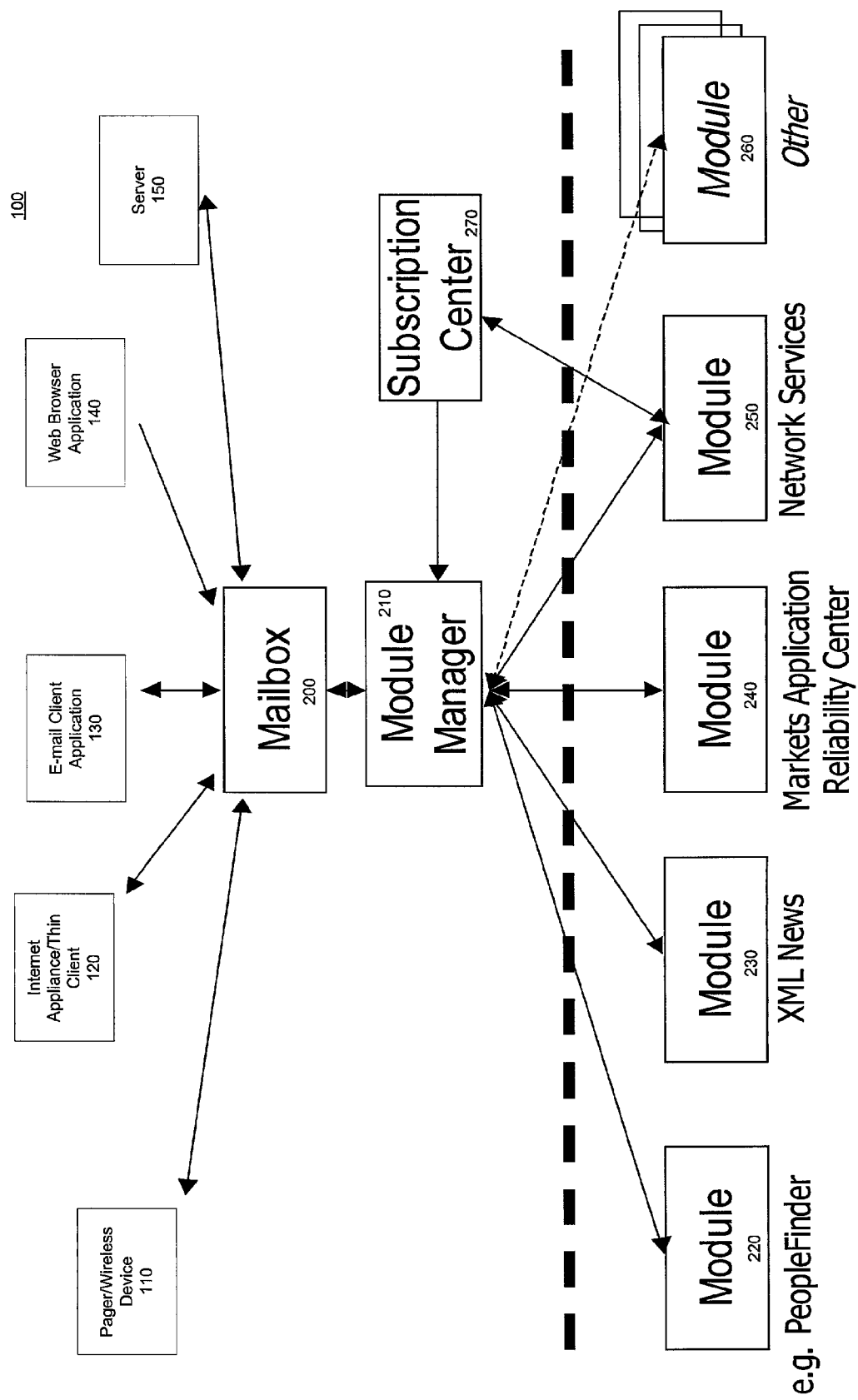
FIG. 1 illustrates a system-level overview of the present invention.
Figure 2:
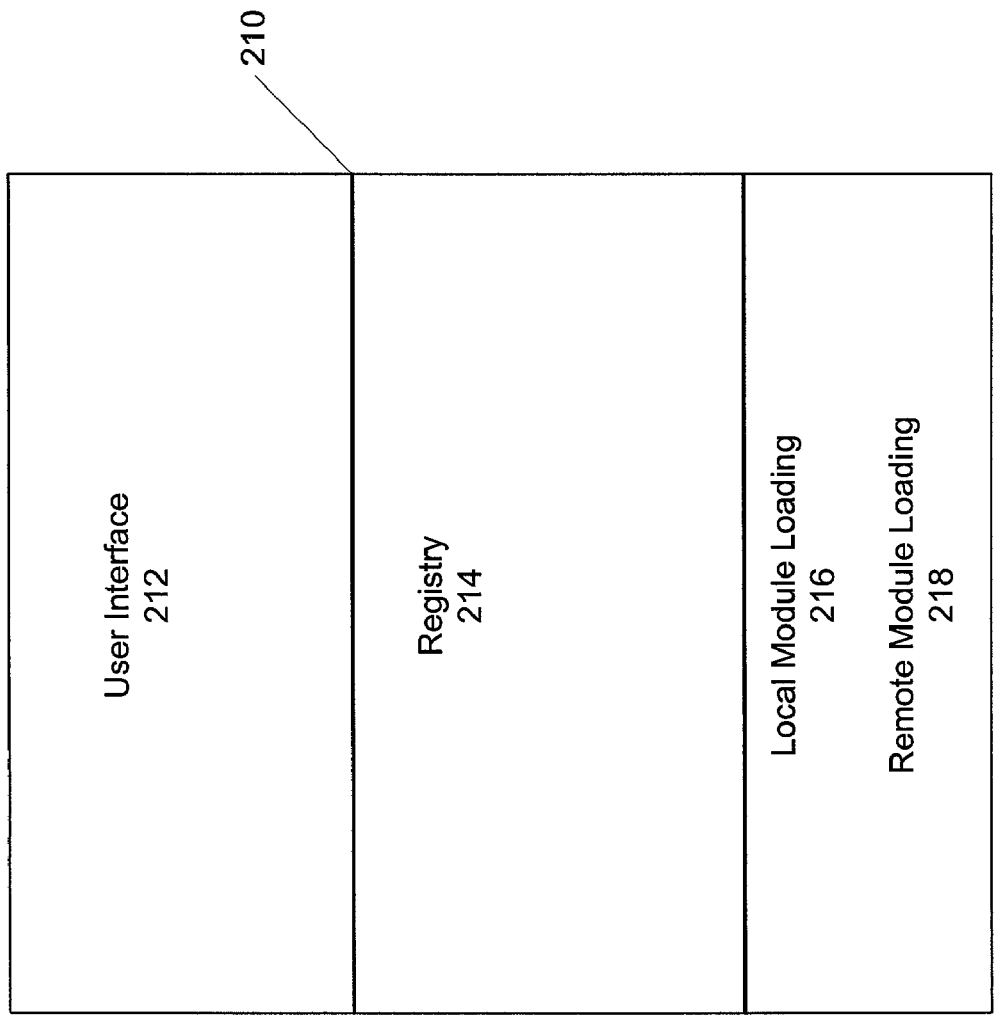
FIG. 2. illustrates an exemplary module manager in accordance with the present invention.
Figure 3:
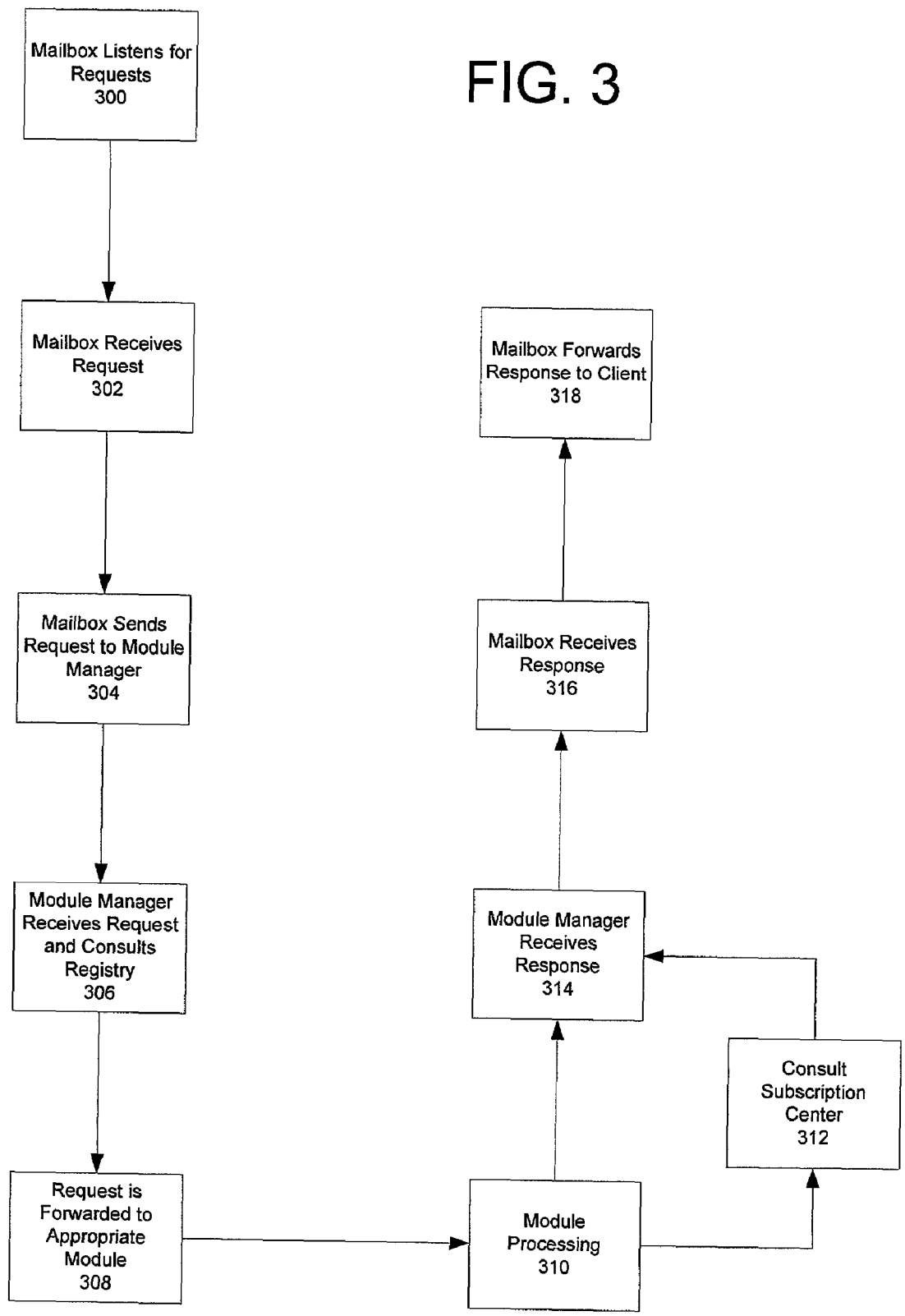
FIG. 3 illustrates an exemplary process flow of user requests and responses by the information modules.

The present invention is directed to an improved system for providing information to users and for managing and routing requests from users. Referring to FIGS. 1-3, there is illustrated an exemplary system-level overview and flow diagrams of the operation of the present invention. The information delivery system 100 is preferably a platform independent application, which enables users to receive responses based upon on-demand, scheduled or event driven requests or triggers. On-demand requests are those that a user sends and, some time later, receives a response with the requested information. Scheduled requests are those provided to users who subscribe to a service offering. On a set schedule, information is sent to the user based upon the information desired and criteria selected. Event driven responses are generated based upon certain criteria or thresholds being met. For each of the above types of requests, the responses may be formatted in plain text, Hypertext Markup Language (HTML) or other format depending upon the requestor device type or the subscriber's specified e-mail client.

In the system 100 of FIG. 1, several exemplary, non-limiting requestor devices/clients are illustrated. In accordance with the present invention, the requesting device may be a pager or wireless device 110 (e.g., cellular telephone, PDA, etc.), an Internet Appliance or Thin client device 120 (e.g., special purpose e-mail device), an email client 130 (e.g., Microsoft® Outlook, Eudora Mail), a Web Browser Application (e.g., Microsoft® Internet Explorer, Netscape® Navigator®, etc.) or a server 150. Any device capable of communicating electronically may operate as a client device within the system 100.

In accordance with the present invention, the clients 110-150 send a message in the format appropriate to the client device to a mailbox 200 that listens for messages (step 300). For example, the e-mail client 130 may send an HTML or plain-text formatted email to the mailbox 200, whereas the server 150 may communicate directly to the mailbox 200 using an appropriate communication protocol. The mailbox 200 acts a client device interface to the system 100 and is preferably a mail server that is capable of receiving and processing Simple Mail Transport Protocol SMTP (or other) communications. The mailbox 200 may also comprise a web server or database server cable of directly receiving and queuing requests from the clients 110-150.

Upon receipt of requests (step 302), the mailbox 200 will queue and forward the requests to a Module Manager 210 (step 304). The module manager 210 mediates all interaction between the mailbox 200 and information and one or more service modules 220-260. In accordance with the invention, the Module Manager 210 is responsible for managing requests and responses to the requests.

According to the present invention, the request/response model is similar to that of the Sun Servlet API. Sun uses HttpServletResponse and HttpServletRequest as wrappers to encapsulate all the interactions between web client and web server. The present invention uses an analogous approach, allowing for enhancements to the existing Request and Response classes without recoding or even recompiling Mail-Centers, Module Managers, or Modules themselves. It is preferable that the requests are serializable Java objects. This allows a request to be saved to disk and restored later if the application is experiencing too high of a service load. Alternatively, a request could be encoded as XML, placed in an HTTP header, and processed through a SOAP or XML-RPC-enabled web server.

The requests made to the module manager 210 may be either synchronous or asynchronous. Synchronous requests are handled on a first-in-first-out basis. Such requests may be directory requests, or other simple requests. Asynchronous requests may require complex or lengthy processing. Responses to these requests are sent as soon as practicable to the requester. For example, a user may request system status information for a very large network. Because this request will take time to process, the module manager 210 will recognize that subsequent user requests should not wait for this request to complete. Accordingly, the subsequent requests will be processed while the present request is processing.

The Module Manager 210 is preferably a lightweight component, where instances are created each time a new request is received and discarded after the request has been handled. This methodology reduces the wasting of CPU cycles as the module manager 210 does not run in a loop waiting for something to happen. It is also preferable that the Module Manager instances are stateless. This property enables dynamic loading of modules since each module manager 210 has no memory of what modules were available on any previous request. Such an implementation is detailed in Designing Enterprise Applications with the Java™ 2 Platform, Enterprise Edition, by Nicholas Kassem and the Enterprise Team, Version 1.0.1, Final Release, Oct. 3, 2000, which is incorporated herein by reference in its entirety. It is further preferable that each instance of the module manager 210 is multi-threaded. Accordingly, a new thread may be created for each request and discarded for the completed response.

The module manager 210 manages a master list (e.g., registry 214) of available modules, loads modules, and routes requests to the appropriate module in accordance with the requested information (step 308). The registry 214 is provided to maintain a list of registered modules within the module manager 210. The module manager 210 also provides a dynamically generated list of service handlers exported by the available modules. The list indicates what services the various registered modules support. This list may be sent to any user requesting help or who sends an undefined term as part of a request.

The module manager 210 also handles service collisions. For example, two modules could register as handlers for the same type of request (e.g., stock quotes). One method to handle this problem is an opportunistic mode wherein whichever module makes the first claim to a request owns it from then on. Another approach is to register and/or prioritize modules to determine which module receives a request.

To load modules, local and remote module loading functions 216 and 218 are provided. The loading of modules is performed dynamically and in accordance with a module's particular physical relationship to the module manager 210. Local modules may reside on the same physical device and communication between the module manager 210 and the local modules may be via memory calls, object inheritance, inter-process communication, or the like. Remote modules may be located in other devices logically connected to the module manager 210 and information is passed using other means such as via TCP/IP sockets, etc.

It is noted that dynamic loading and unloading modules allows for modules to be added to or removed from the module manager application 210 without a restart of the module manager 210. Thus, the system 100 is highly scalable and extensible to adapt to changing requirements and needs.

The Module Manager 210 routes requests to the appropriate module for processing and generating a response (step 310). For example, the module manager 210 may be aware of four registered modules, a peoplefinder module 220 (directory service), a news module 230, a markets application reliability center 240 (network applications), and a network services module 250 (server status). As noted above, other modules 260 may register with the module manger 210 to handle requests for information.

In accordance with the present invention each of the modules 220-260 presents a common interface to the Module manager 210. A common interface advantageously enables modules to be developed quickly via a software development kit (SDK). The modules 220-260 are preferably JAVA-based, however, the modules may be based in any language capable of reconstituting a request using serializable objects.

Figure 5:
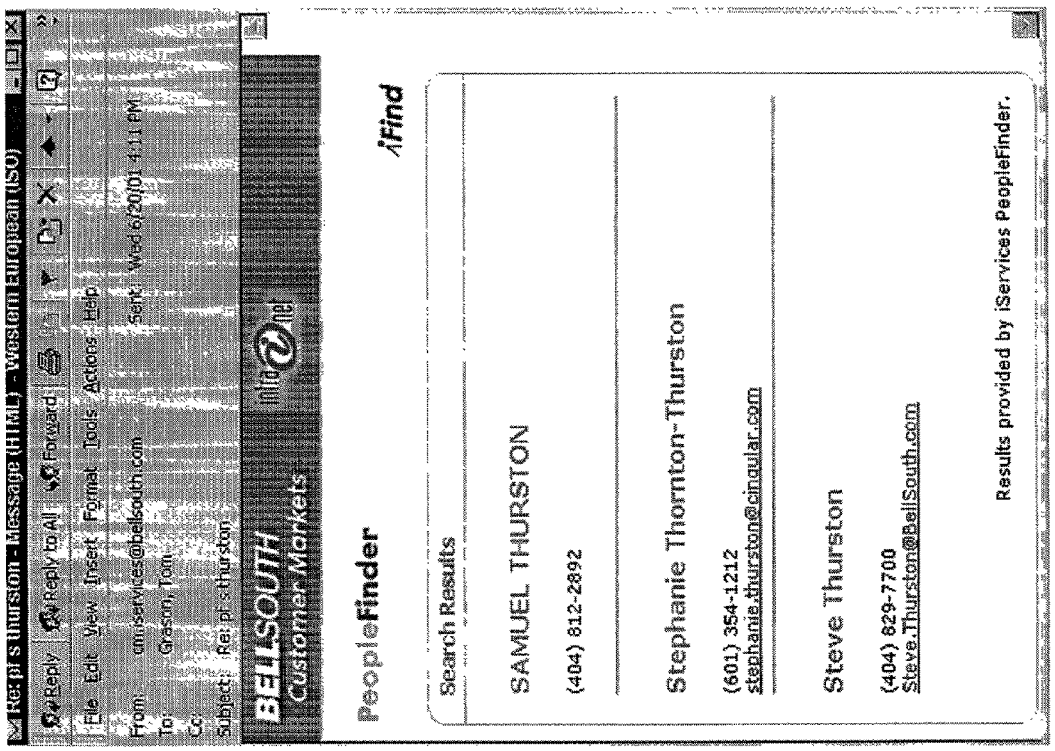
FIGS. 4 and 5 are exemplary e-mail responses formatted in HTML.
Figure 4:
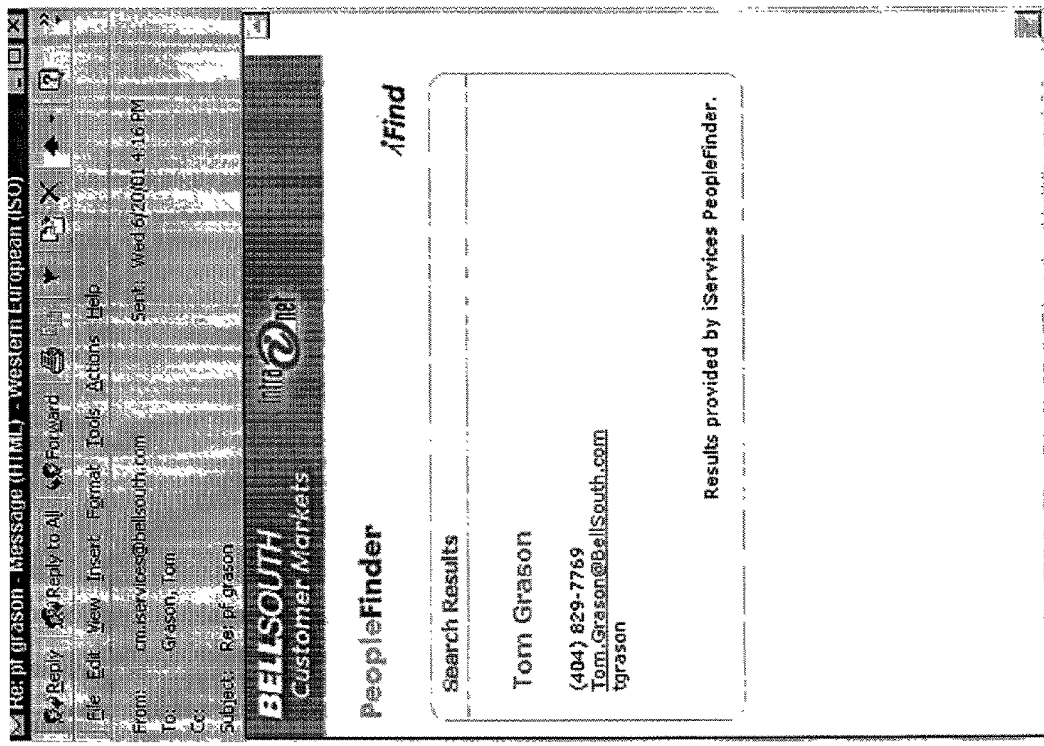

After completing its processing, the module then returns the response to the module manager 210 (step 314). The responses are preferably serializable Java objects. The module manager 210 then sends the response to the mailbox (step 316), which formats an e-mail appropriate for the requesting client device 110-140 (e.g., plain text, rich text, page, etc.). Examples of a formatted response are show in FIGS. 4 and 5, which are HTML e-mail responses sent to the e-mail application 130.

In accordance with the present invention, asynchronous subscription information may be sent to the clients 110-150. Each client or a user of a client may subscribe to receive a particular module's information (via a request or other user interface). A subscription center 270 is provided to maintain a database of subscribers to a particular module's information. When information is sent by the modules (at step 310) the subscription center 270 is consulted (step 312) to determine to which clients the information should be forwarded. Once the clients are determined at step 312, the information is forwarded as a response, as detailed above. A further description of the subscription process is explained in Scenario 2 below.

Referring again to FIG. 2, the Module Manager 210 includes a user interface (UI) 212, e.g., a graphical user interface, such that an administrator may configure the module manager 210. It is preferable that the UI allows for web-based loading and unloading of modules. This allows for the easy update of active modules and the unloading of modules that are no longer in use. Other parameters may also be configurable by the administrator using the UI 212.

Although not shown in the FIGS., the Module Manager 210 may also work with multiple mailboxes 200 at the same time. The Module Manager 210 may manage different module lists and other preferences for each Mailbox 200, or one master list in order to route requests and responses.

Usage Scenarios

Scenario 1

A vacationing user needs to reach a customer while driving her car to discuss status of a project. The user has an interactive pager 110. In accordance with the present invention, the user sends a page to the e-mail account associated with the mailbox 200. The subject line of the email shows the service being requested as well as the request parameter(s) specific to her needs. For example, the user may send the following: subject: Find S. Thurston This request will be sent to the mailbox 200 and forwarded to the module manager 210. The module manager 210 will forward this request to the peoplefinder module 220. The peoplefinder module 220 will query a directory and return all occurrences where a person's name begins with 's' and has 'thurston' in the last name field. Each matching record may have the person's full name, phone number, interactive pager id, email address, etc.

Within minutes of sending her request, her pager vibrates with a response from the system 100 showing her all matching records. By scrolling down she can find the appropriate record so she may call e.g., Steve Thurston via her cell phone.

Scenario 2

A company employee would like to receive a listing of news and information via email so he can stay current with the corporate activities. In this scenario, the employee registers via, e.g., a corporate web site, which shows all of the news offered for subscription. During the registration process he is asked what his preferred method of correspondence is, e.g., e-mail, pager, or web-based delivery. In this scenario, he indicates e-mail and provides an e-mail address.

After viewing the subscription options, he decides to select daily clips. The subscription center 270 notes this and, at a specific time each day, sends an e-mail to the company employee listing the header of each daily clip article as well as a hyperlink to the full body of the text. Optionally, the service could send the full article.

Here, the employee is using Microsoft® Outlook® as his e-mail client 130. Accordingly, the daily clips e-mail is formatted with rich text using HTML for easy reading and a professional appearance.

Scenario 3

While in a meeting with a Business President, the subject of network and system outages comes up. The IT team is caught off guard and quickly needs to find out the number of outages in this area. Here an IT manager sends a request to the mailbox 200 asking for all outages from the past month. The module manager 210 routes this to module 240, wherein the information is determined and a response is generated that there have been 12 outages during this timeframe with an average outage duration of 2 hrs 10 minutes. The longest outage was for 3 hours 14 minutes. The IT manager may then report this information in the meeting without leaving the meeting or an extended period of delay.

Scenario 4

A server administer is at lunch when he receives a message from his manager stating that one of the servers he is responsible is down. Instead of driving to the office, he sends a message via his pager to the e-mail account associated with the mailbox 200 asking if the server is available. The module manager 210 sends the request to the network services module 250, and within a few minutes he receives a response stating that the server is available. To further confirm the server is available, he sends another request asking if the application component of the server is operating. In just a couple of more minutes, he receives a response from the network services module 250 indicating that it was able to confirm that the application layer on the server was up and running. Finally, he sends a page to his manager that the server and application are up and running.

Various modifications of the invention, in addition to those described herein, will be apparent to those of skill in the art in view of the foregoing description. Such modifications are also intended to fall within the scope of the appended claims.

What is claimed:

1. A distributed information processing system, comprising:
 a first computing device having a physical memory with a client device interface stored thereon, the client device interface being adapted to receive requests for a type of information from a plurality of remote devices;
 a second computing device having a physical memory with a stateless module manager stored thereon, the stateless module manager being adapted to receive and route said requests from said client device interface; and
 a plurality of third computing devices having physical memories with information modules stored thereon, wherein said information modules register with said stateless module manager, and wherein the stateless module manager routes said requests to an appropriate one of said plurality of information modules in accordance with the type of information requested, wherein the stateless module manager handles service collisions in which a plurality of information modules are capable of responding to the requests, such that only one information module processes the requests, wherein the stateless module manager enables only one of the information modules to claim the requests and to receive all subsequent requests associated with the type of information, the stateless module manager enabling the only one information module to receive the subsequent requests independent of an availability of other information modules; and wherein said client device interface is adapted to receive a plurality of request types, said request types comprising:

on-demand requests, which are sent to said client device interface by a user of one of said remote devices when said user desires an on-demand response;

scheduled requests, which are sent to said client device interface by said user when said user desires a plurality of scheduled responses from a subscription service provided by one of said information modules; and event driven requests, which are sent to said client device interface from one of said remote devices when certain criteria are met.

2. The distributed information processing system as recited in claim 1, wherein the requests to the device interface are formatted as an HTML or plain-text formatted e-mail or serializable Java objects.

3. The distributed information processing system as recited in claim 1, wherein the appropriate one of said plurality of information modules generates a response that is returned to said stateless module manager, and wherein said stateless module manager routes said response to said client interface device for delivery to a requestor.

4. The distributed information processing system as recited in claim 1, wherein the stateless module manager enables the one of the information modules to own the subsequent requests independent of which of the plurality of remote devices transmits the requests and the subsequent requests.

5. The distributed information processing system as recited in claim 1, wherein said requests are made to said stateless module manager as one of a synchronous or asynchronous request, wherein synchronous requests are handled on a first-in-first-out basis, and wherein asynchronous requests are processed and returned when completed.

6. The distributed information processing system as recited in claim 1, wherein instances associated with said stateless module manager are created each time a new request is received and discarded after the request has been handled.

7. The distributed information processing system as recited in claim 6, wherein instances associated with said stateless module manager are stateless and multi-threaded.

8. The distributed information processing system as recited in claim 1, wherein information modules are loaded locally and remotely, wherein local module processors reside on a same physical device as said stateless module manager processor, and wherein remote module processors are located on other devices.

9. The distributed information processing system as recited in claim 8, wherein communication between locally loaded module processors and said stateless module manager processor is accomplished via memory calls, object inheritance or inter-process communication.

10. The distributed information processing system as recited in claim 8, wherein communication between remotely loaded module processors and said stateless module manager is accomplished via TCP/IP sockets.

11. The distributed information processing system as recited in claim 1, wherein the subscription service further comprises a subscriber database, wherein information is sent by said information module, and said subscriber database is consulted to determine to which users of said remote devices the information should be forwarded.

12. A method of receiving and responding to requests for electronic information in a distributed information processing system, the method comprising:

receiving requests for a type of information at a client device interface;

forwarding said requests to a stateless module manager;

consulting a registry of available information modules; and forwarding said requests to an appropriate information module as determined in accordance with the type of information requested;

handling service collisions if plural information modules are capable of responding to the requests, such that only one information module processes the requests, and enabling only one of the information modules to claim the requests and to own subsequent requests based on the type of information being common to each of the requests and the subsequent requests, the stateless module manager enabling the only one information module to receive the subsequent requests independent of an availability of other information modules;

wherein said client device interface is adapted to receive a plurality of request types, said request types comprising:

on-demand requests, which are sent to said client device interface by a user of one of said remote devices when said user desires an on-demand response;

scheduled requests, which are sent to said client device interface by said user when said user desires a plurality of scheduled responses from a subscription service provided by one of said information modules; and event driven requests, which are sent to said client device interface from one of said remote devices when certain criteria are met.

13. The method of claim 12, further comprising:

maintaining a list of supported services provided by each of said information modules; and registering said information modules for responding to requests for said type of electronic information.

14. The method of claim 12, wherein the one of the information modules owns the subsequent requests independent of a source of the requests and the subsequent requests.

15. The method of claim 12, wherein said requests are made to said stateless module manager as one of a synchronous or asynchronous request, wherein synchronous requests are handled on a first-in first-out basis, and wherein asynchronous requests are processed and returned when completed.

16. The method of claim 12, said method further comprising:

creating an instance of said stateless module manager upon receiving said request; and discarding said instance after said response has been handled.

17. A computer readable medium containing computer executable instructions for receiving and responding to requests for electronic information in a distributed information processing system, said computer executable instructions for performing the steps of:

receiving requests for a type of electronic information at a client device interface;

forwarding said requests to a stateless module manager;

consulting a registry of available information modules;

forwarding said request to an appropriate information module as determined in accordance with the type of electronic information requested;

handling service collisions if plural information modules are capable of responding to the requests, such that only one information module processes the requests, and enabling only one of the information modules to claim the requests and to own subsequent requests based on the type of electronic information being common to each of the requests and the subsequent requests, the stateless module manager enabling the only one information module to receive the subsequent requests independent of an availability of other information modules;

wherein said client device interface is adapted to receive a plurality of request types, said request types comprising:

on-demand requests, which are sent to said client device interface by a user of one of said remote devices when said user desires an on-demand response;

scheduled requests, which are sent to said client device interface by said user when said user desires a plurality of scheduled responses from a subscription service provided by one of said information modules; and event driven requests, which are sent to said client device interface from one of said remote devices when certain criteria are met.

18. The computer readable medium of claim 17, further comprising computer executable instructions for performing the steps of:

maintaining a list of supported services provided by each of said information modules.

19. The computer readable medium of claim 17, wherein the one of the information modules owns the subsequent requests independent of a source of the requests and the subsequent requests.

20. The computer readable medium of claim 17, wherein said requests are made to said stateless module manager as one of a synchronous or asynchronous request, wherein synchronous requests are handled on a first-in-first-out basis, and wherein asynchronous requests are processed and returned when completed.

21. The computer readable medium of claim 17, further comprising executable instructions for performing the steps of:

creating an instance of said stateless module manager upon receiving said request; and discarding said instance after said response has been handled.

* * * * *